United States Patent [19]

Watanabe

[11] Patent Number: 5,444,699
[45] Date of Patent: Aug. 22, 1995

[54] CALL AND CONNECTION SET UP SYSTEM IN TRANSMISSION NETWORK

[75] Inventor: Yoshihiro Watanabe, Kawasaki, Japan

[73] Assignee: Fujitsu Limited, Kawasaki, Japan

[21] Appl. No.: 361,713

[22] Filed: Dec. 22, 1994

Related U.S. Application Data

[63] Continuation of Ser. No. 34,123, Mar. 18, 1993, abandoned.

[30] Foreign Application Priority Data

Mar. 19, 1992 [JP] Japan .................. 4-063778
Mar. 19, 1992 [JP] Japan .................. 4-064018

[51] Int. Cl.⁶ ............................. H04J 3/12
[52] U.S. Cl. ................. 370/54; 370/60.1; 370/79; 370/110.1; 379/220
[58] Field of Search ........... 370/54, 60, 60.1, 62, 370/79, 94.1, 94.2, 110.1; 379/158, 202, 206, 220

[56] References Cited

U.S. PATENT DOCUMENTS

| | | | |
|---|---|---|---|
| 4,805,166 | 2/1989 | Ardon et al. | 370/54 |
| 4,991,204 | 2/1991 | Yamamoto et al. | 370/54 X |
| 5,050,005 | 9/1991 | Kagami | 370/110.1 X |
| 5,051,982 | 9/1991 | Brown et al. | 370/110.1 X |
| 5,224,098 | 6/1993 | Bird et al. | 370/94.1 |

*Primary Examiner*—Douglas W. Olms
*Assistant Examiner*—Russell W. Blum
*Attorney, Agent, or Firm*—Staas & Halsey

[57] ABSTRACT

A direct path (D-PATH) to be used by a call link is set up in advance between all of the nodes. A connection link is to use a route separate from this direct path. In this way, if layer incompatibility is detected between a transmission terminal (13) and a receiving terminal (13) at the time of a call link, a connection path (C-PATH) separate from the direct path (D-PATH) is set up from a transmission node (8) to a receiving node (8) via a data exchange node. In this way various B-ISDN services can be realized.

10 Claims, 17 Drawing Sheets

5,444,699

CALL AND CONNECTION SET UP SYSTEM IN TRANSMISSION NETWORK

This application is a continuation of application Ser. No. 08/034,123, filed Mar. 18, 1993, now abandoned.

BACKGROUND OF THE INVENTION

1. Field Of The Invention

The present invention relates to a transmission control system for an ATM network wherein the call set up and the connection set up are separate.

2. Description Of The Related Art

At present B-ISDN (Broad-band Integrated Service Digital Network) is being examined as next generation transmission technology and ATM (Asynchronous Transfer Mode) is being considered for use as transmission exchange technology with B-ISDN. In this ATM exchange technology, data such as audio or pictures is transferred as fixed length packets known as cells. The bands therefore have to be divided in a fixed manner corresponding to the amount of information, which proved to be difficult using conventional STM (Synchronous Transfer Mode) systems. New technology is therefore desired where information such as picture information will undergo instantaneous expansion in a transfer process.

Also, even with ATM exchange technology call set up procedures already exist. This is to say that call and connection routes can be established from a transmission node (transmission exchange) to a receiving node (receiving exchange) via a plurality of relay nodes (relay exchanges) by sequentially linking between stages, which is known as "link by link" connecting. Although the transmission speed once the connection has been made is sufficiently fast with this system, it takes a long time to actually establish the connection in the first place.

ATM networks have to be able to handle large amounts of information transmitted over short periods of time i.e. what are known as information "bursts". So, depending on the information, it is necessary to select a route which will keep the number of lost cells to a minimum (routes with large bandwidths) while taking into account the fact that the call set up and connection set up routes must be different.

As this invention sets out to solve the problems encountered in the related art, its purpose is to provide a control system which carries out call set ups at high speeds while keeping call and connection paths separate.

SUMMARY OF THE INVENTION

It is therefore an object of the present invention to provide a transmission control system for an ATM network wherein the call set up and the connection set up are separate.

According to this present invention, there is provided a call set up system for a transmission exchange network which transfers cells containing routing information between individually numbered nodes, comprising:

a plurality of routing information tables situated one in each of the nodes for cataloguing the routing information for the individual node;

a plurality of exchange control units each situated in the respective node for managing the associated routing information table;

a plurality of switching units each situated in the respective node for exchanging the routing of a cell rewritten according to contents of the associated routing information table; and a maintenance center for housing a network organization data base in which a transmission node number and an output route number for each and every one of the nodes are catalogued, the maintenance center being adapted to previously set up direct paths between all of the nodes, which are to be managed by the maintenance center, by giving notification of a receiving node number and an output route number for each node and by cataloguing the receiving node number, as the routing information, with the output route number in the routing information table;

wherein a call set up will be made to a receiving node via a direct path, which is regulated by the corresponding routing information table, upon arrival of a call set up request cell at any one of a number of transmission nodes connected to a transmission terminal.

IN THE ACCOMPANYING DRAWINGS

DESCRIPTION OF THE PREFERRED EMBODIMENTS

Figure 1:
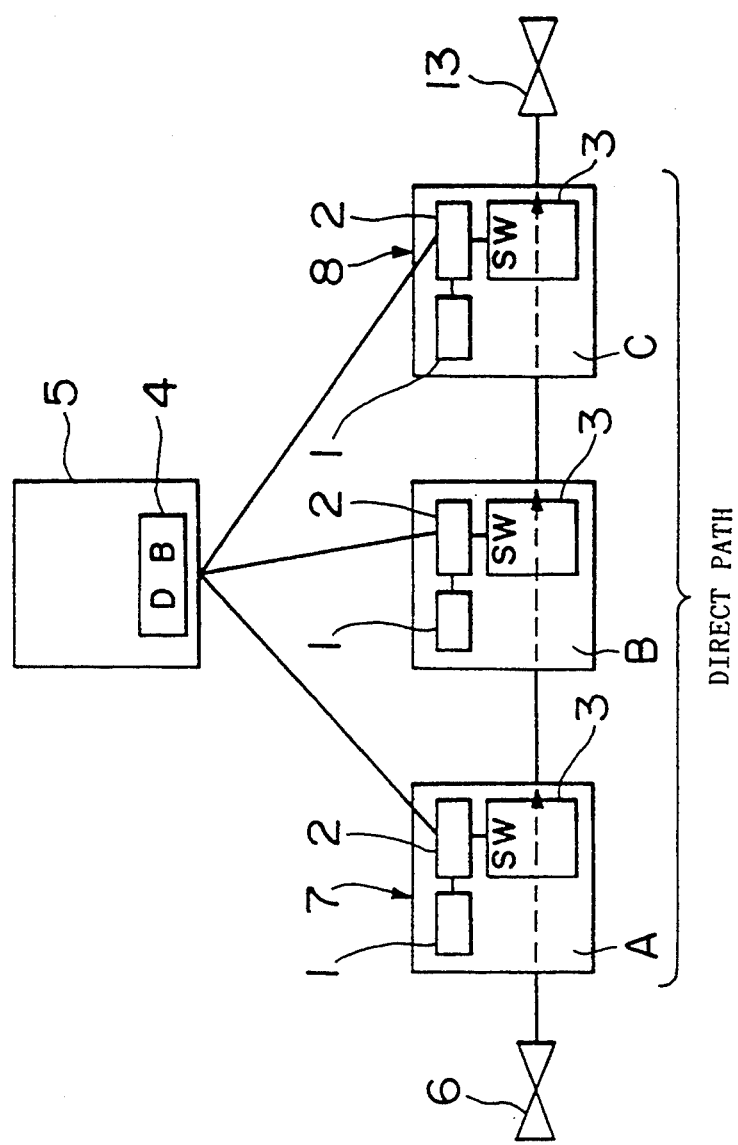
FIG. 1 shows the theory involved in the present invention.

The present invention will now be described with reference to the accompanying drawings:

As is better understood from the principles shown in FIG. 1, when a call set up request cell arrives, each node resends the call set up request to the next node, irrespective of the band width, based on the routing information table 1 predetermined by the maintenance center 5 including database 4. Thus by setting up direct paths between all of the individual nodes, it is possible to perform a call linking process efficiently at high speed and separately from the connection linking.

Further, since connection linking is separated from call linking, it is possible to perform various kinds of connection linking as well as additional and/or alternative connection linking while holding the present call link, thus a variety of efficient and high-speed communication systems and services can be realized. Each transmission node includes a routing information table 1, an exchange control unit 2 and a switching unit 3. Transmission terminal 6 transmits cells to receiving terminal 13 via a direct path. The direct path includes transmission node A, relay node B, and receiving node C, for example. Each node resends the call set up request to the next node.

FIRST EMBODIMENT

Figure 2:
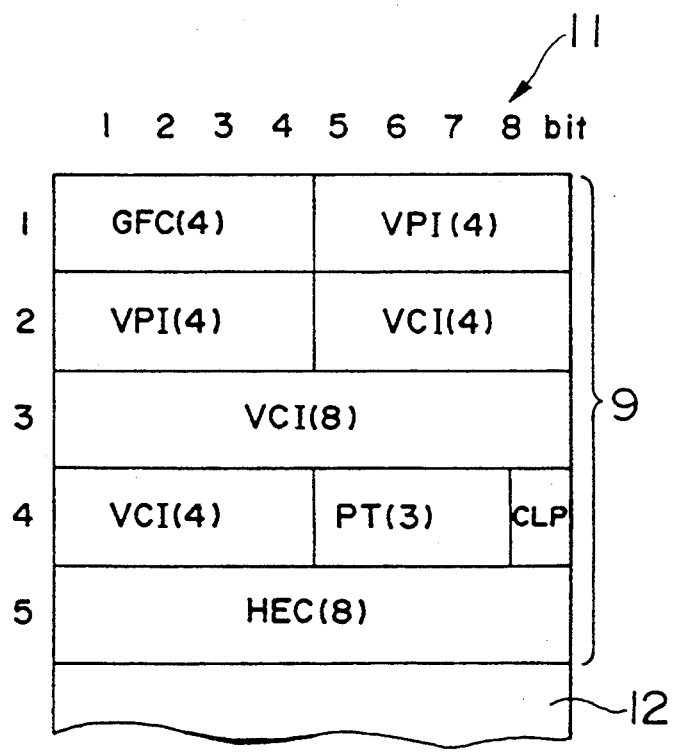
FIG. 2 is a view describing an ATM cell format.
Figure 3:
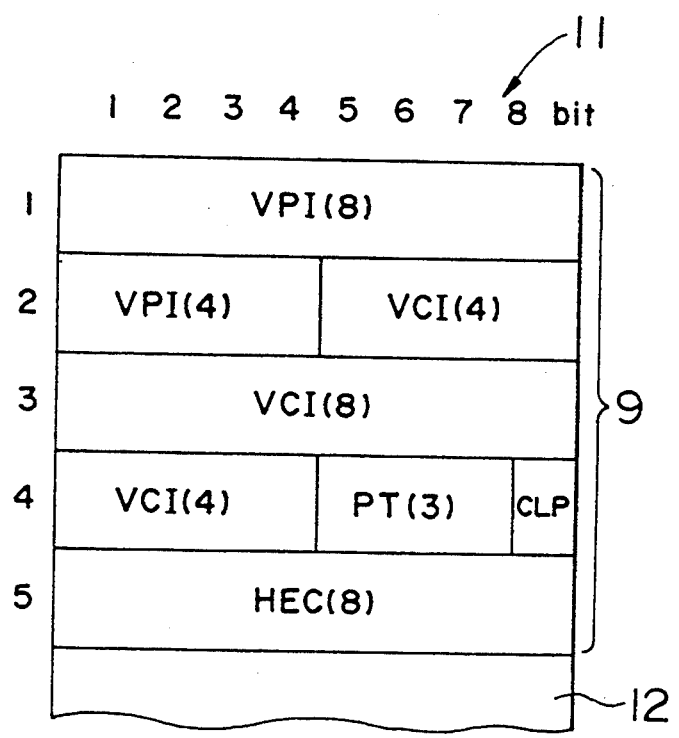
FIG. 3 is a view describing a further ATM cell format.

FIGS. 2 and 3 are views of ATM cell formats 11. FIG. 2 shows a format of a header region of a cell 11 from the transmission terminal 6 to the transmission node 7 and FIG. 3 shows a format of a header region of a cell 11 between nodes.

A header 9 is made up of 4 bits of flow control information (GFC: Generic Flow Control), 8 bits of pass information (VPI), 16 bits of channel information (VCI), 3 bits of cell form information (PT: Payload type), cell loss priority information (CLP: Cell Loss Priority) and 8 bits of header control information (HEC: Header Error Control).

In FIG. 3 the flow control information (GFC) has been replaced by additional pass information.

In the case of both formats the headers are followed by corresponding information fields 12. Cell 11 has its routing information, that is to say its pass information (VPI) and its channel information (VCI) re-written at each node before finally being passed on to the receiving terminal 13 by the receiving node 8.

Figure 4:
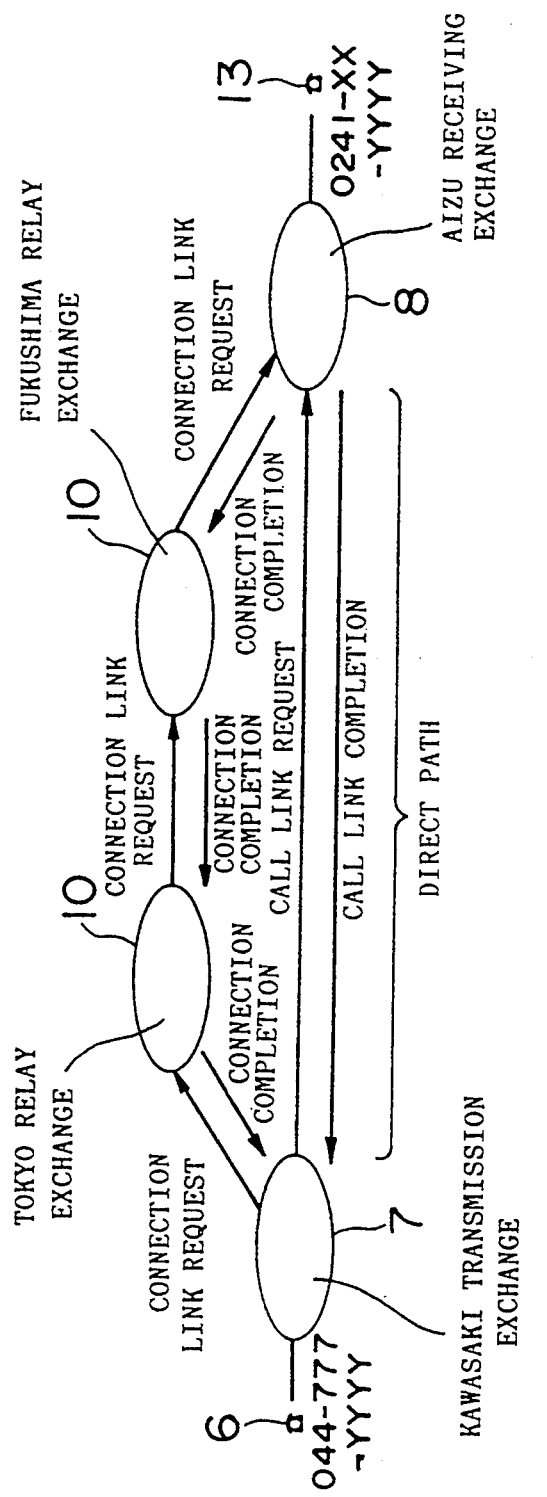
FIG. 4 is an overall view of how separation of the call set up and connection set up is controlled for a first embodiment of the present invention.

FIG. 4 is a conceptual view of how separation of the call set up and connection set up is controlled for a first embodiment of the present invention.

In FIG. 4, there is a plurality of nodes 10 between the transmission terminal 6 and the receiving terminal 13. A connection link request travels stage by stage via these nodes but a call link request travels directly from the transmission node 7 to the receiving node 8. In reality this is not strictly speaking a "direct path" as the call link request also has to pass through each node 10 but by employing a process such as band securing in the linking process only the cell 11 of the call link request will have to be sent via the nodes 10.

Figure 5:
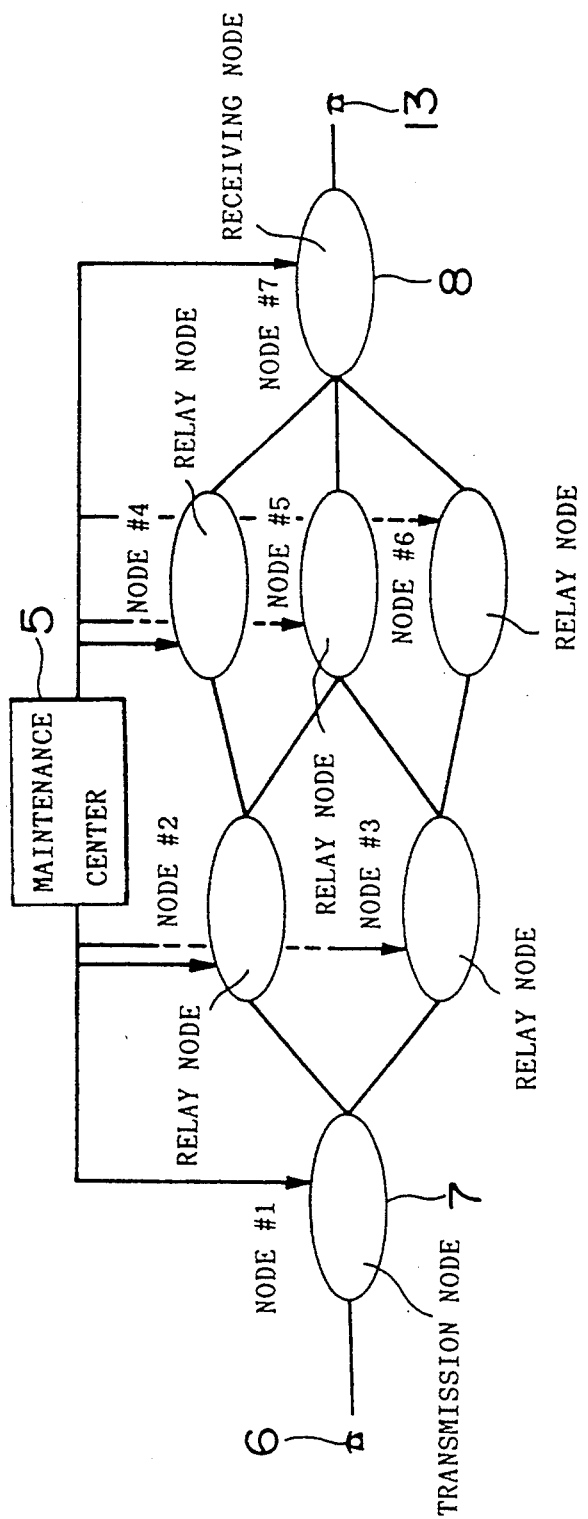
FIG. 5 is a view of the organization of the entire network for the present invention.

FIG. 5 is a view of the organization of the entire network for this embodiment. In this diagram each node has an accompanying node number. The maintenance center then uses these numbers for the overall management of the nodes.

Figure 6:
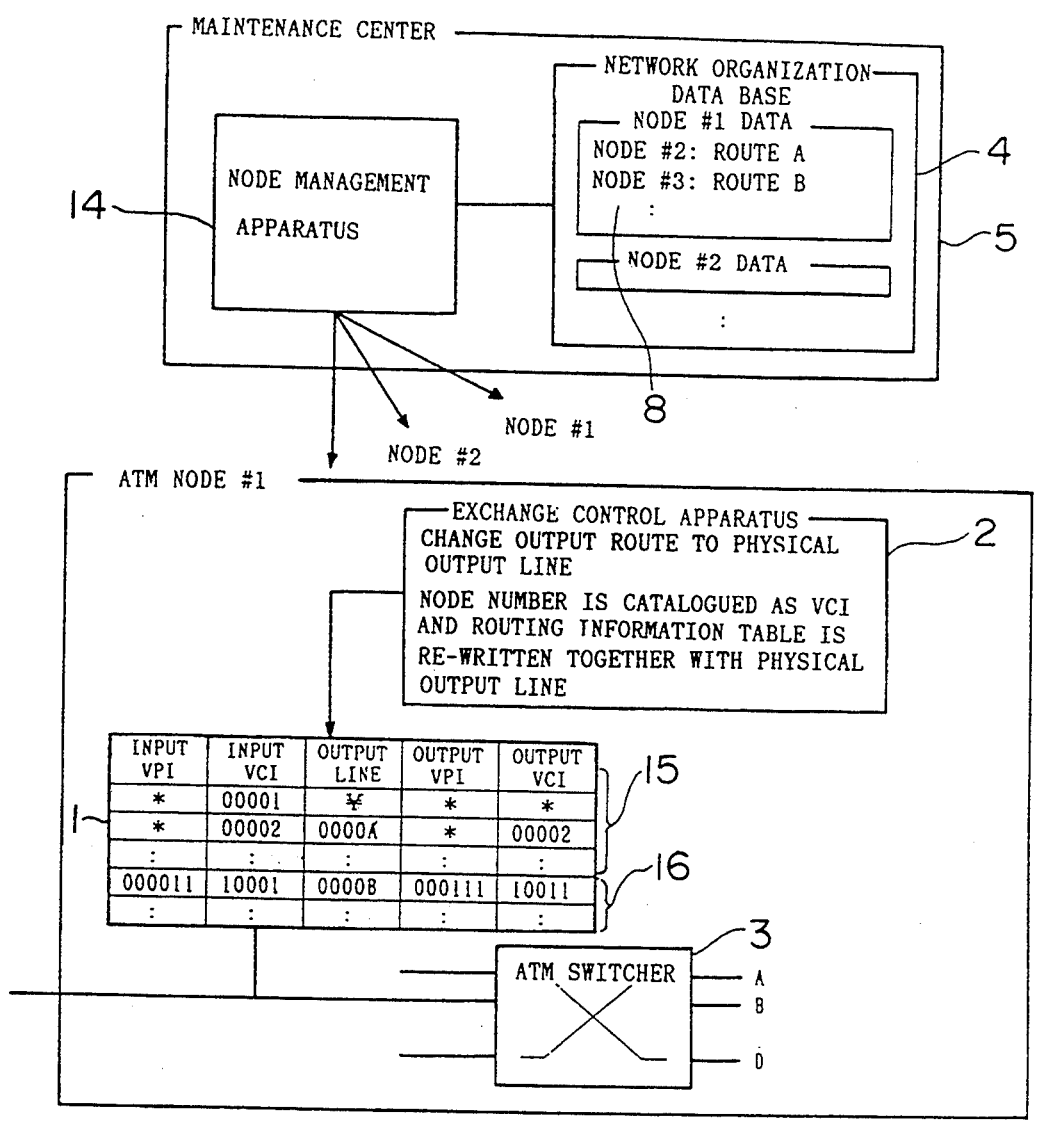
FIG. 6 is a block diagram of the organization of the maintenance center and the nodes for the present invention.

FIG. 6 is a block diagram of the organization of the maintenance center and the nodes. This diagram also shows the network organization database 4 and the node management apparatus 14 within the maintenance center 5.

The network organization database 4 has a catalogue area for each node. This catalogue contains the number of the node 8 and the corresponding output route number. Taking node #1 in FIG. 6 as an example, when the cell 11 arrives at the receiving node 8 the number of which is #2, this cell will be output by the output route "A".

Each node is set up via the exchange control apparatus 2, the routing information table 1 and the switching apparatus 3.

It is the function of the exchange control apparatus 2 to control the re-writing of the routing information table 1. So, the contents of the routing information table 1 are re-written in accordance with the header information of the cell 11 which has arrived at the node before it is passed on to the switching apparatus 3.

The routing information table 1 indexes the pass information (input VPI) and channel information (input VCI) of the cell 11 which has been input as well as cataloguing the pass information (output VPI) and the channel information (output VCI) of the node line along which the cell 11 is output.

The routing information table 1 is actually divided into a direct link table 15 and a user table 16 but this embodiment is only concerned with the direct link table 15.

With regards to the routing information for the call links in this embodiment, the node number for the receiving node 8 is catalogued without modification as the channel information (VCI). With further reference to FIG. 6, ≢ represents an output line for transmitting cell 11 from a sending node 1 to a receiving node 8 of node number 2. This corresponds to an input VCI of [00001] in table 15.

Also, the symbol * in the routing information table 1 in FIG. 6 stands for "don't care", so any information for the cells 11 represented by this can be ignored. In the same diagram, the output line for the cell 11 which has an input VCI of [00002] will be [0000A] regardless of the values of the input and output VPIs, with the input VCI being output as the output VCI without modification.

In this way the output line is decided only with reference to the channel information (VCI) for use with the direct links while the pass information (VPI) is disregarded. Also, the channel information (VCI) defines each node within the overall network. So, with each node, for the case of the arrival of a cell 11 where its channel information (VCI) is the same as its node number, the cell 11 will be taken in so as its node can become the receiving node 8. For the case of the arrival of a cell 11 where its channel information (VCI) and its node number are different, this channel information is output without being modified or re-written to the preceding node to be decided by the routing information table 1.

In this embodiment, in order to set up a direct path through all the nodes the contents of the maintenance centers 5 network organization database 4 must pass through the node management apparatus 14 and the exchange control apparatus 2 of each node to be notified.

In the exchange control apparatus 2 for each node, when this notification is received the node number is exchanged for the input VCI and output VCI. The output route number is then exchanged with the physical output line number and these are then catalogued in the direct link table 15 of the routing information tables 1.

By inputting the overall routing information held in the network organization database 4 into the routing information tables 1 for each node in advance, it is possible to create a direct path between all the nodes whichever way the call link request goes from the transmission node 7 to the receiving node 8.

FIG. 4 shows an example of a direct path set up between a transmission node 7 at Kawasaki exchange and a receiving node at Aizu exchange.

As factors such as bandwidth have not been taken into consideration at all this direct path can only be used with call set ups. However, this call set up process is very fast and highly efficient when compared to conventional technology.

Also, a process similar to that used in conventional technology is used for connection linking whereby bandwidth is secured between nodes and the links are made stage by stage. Therefore, for the case of a connection link request, a band is secured to the next node while the routing information tables 1 for each node are being re-written so that the overall connection link is made stage by stage.

FIG. 4 shows how a connection link is made by making links from the Kawasaki exchange to the Tokyo exchange on to the Fukushima exchange and finally on to the Aizu exchange.

By separating the call set up sequence and the connection link sequence in this embodiment in this way, the call set up sequence can take a direct path between all the nodes which means that the call set up process can take place at a high speed.

SECOND EMBODIMENT

In the first embodiment the direct link table 15 set up by the maintenance center 5 handled the overall management of the nodes. In the first embodiment the direct link table 15 set up by the maintenance center 5 handled the overall management of the nodes. In this second embodiment, however, a direct path is set up by each node controlling the linking of itself with other nodes.

Figure 8A:
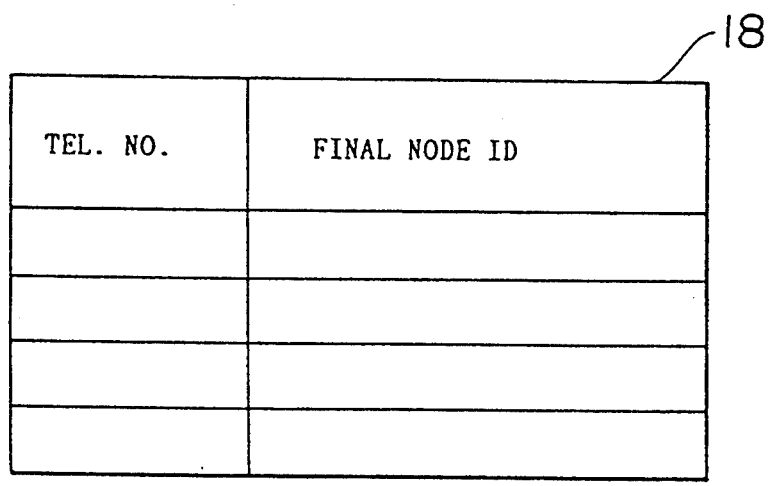
FIG. 8($a$) shows an outline of the call link analysis table and FIG. 8($b$) shows an outline of the connection link analysis table.
Figure 9:
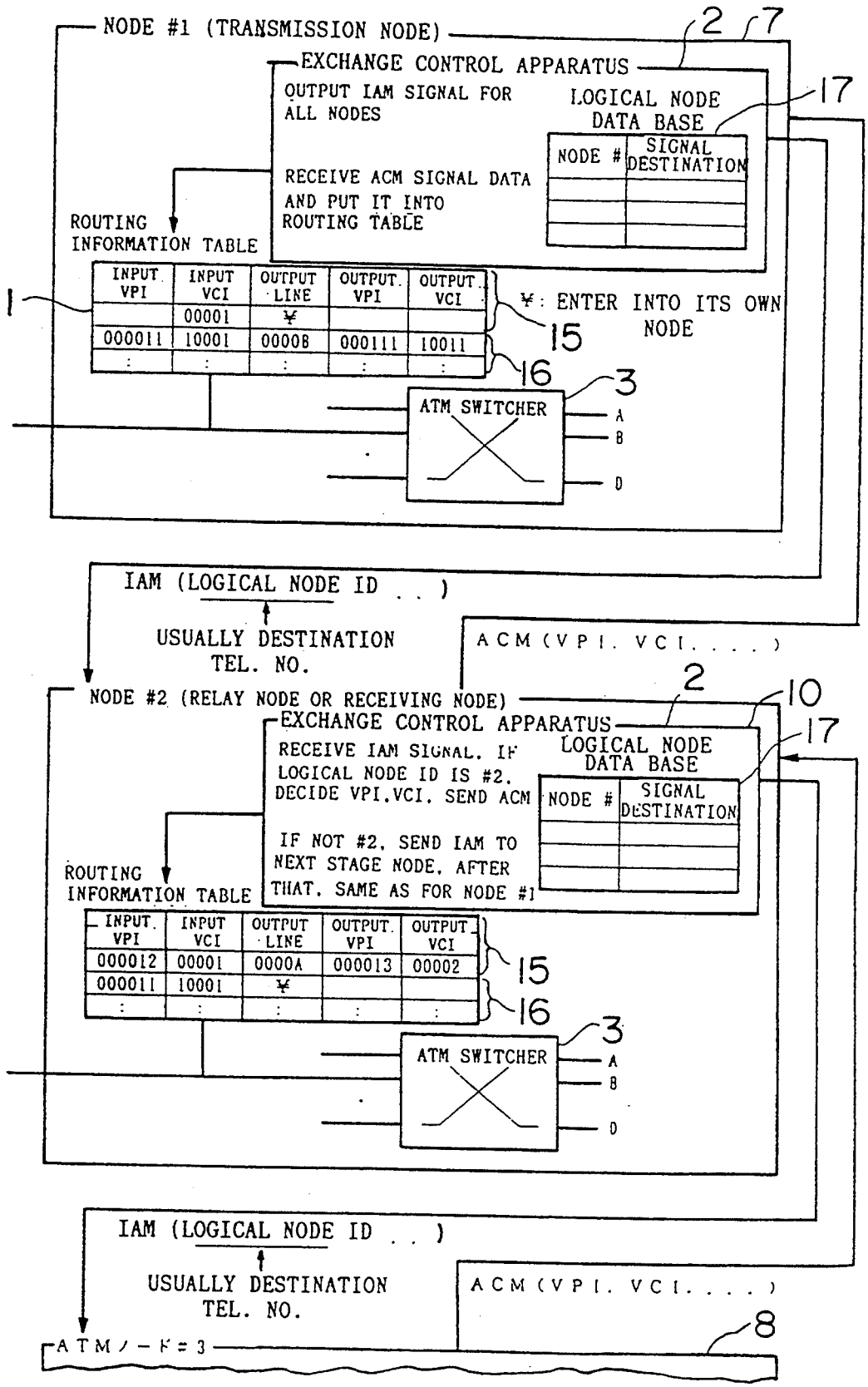
FIG. 9 is a block diagram of the internal organization of each node for a second embodiment.

In FIG. 9, each node has exchange control apparatus 2 inside each of which there is a logic node data base 17 containing all the node numbers and their corresponding output signal (send) destinations (output routes) to the next node 10. In addition to this, as is shown in FIG. 8(a), there is a call link analysis table 18, and a connection link analysis table 20 but these tables will be described later.

Figure 8B:
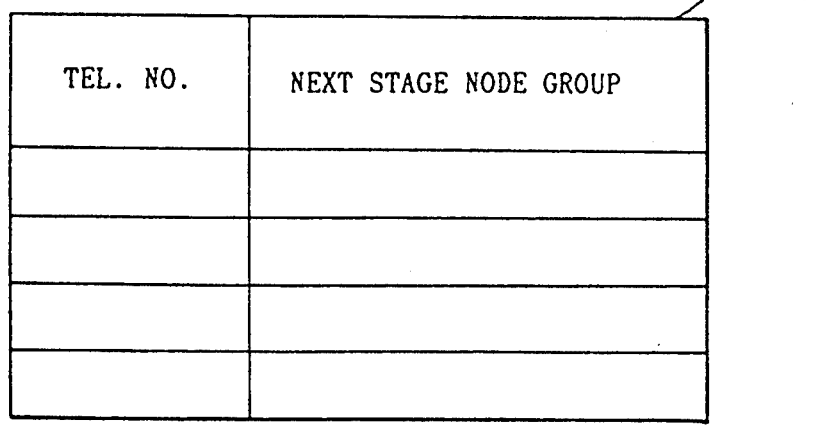

The routing information table 1 and FIG. 8(b) shows the switching apparatus 3 are of a similar organization to those in the first embodiment with the routing information again having a direct link table 15 and a user table 16.

The set up sequence of the direct path between the nodes will now be described with reference to FIG. 9.

The number of the node opposing the transmission node 7 is contained within the IAM signal for the direct path set up request and is transmitted to all of the nodes.

At the relay node 10 (#2), for the case where the node number contained within the IAM signal for the direct path set up request and the relay nodes own number are the same, the relay node will itself become a receiving node 8 and as the VPI and VCI between this node and its preceding node are already decided, these are housed within the ACM signal for the direct path set up signal completion notification and are put back into the transmission node 7 (#1). The transmission node 7 (#1) then updates its own routing information table 1 according to the VPI and VCI housed within the ACM signal.

On the other hand, for the case where the node number contained within the IAM signal for the direct path set up request received from the node 7 by the relay node 10 and the relay nodes own number are not the same, the VPI and VCI between this node and its preceding node are renewed and the direct path set up request signal (IAM signal) is passed on to the next stage node 8 (#3).

Then, for the case where the next stage node is a receiving node 8 (#3), a notification of direct path set up completion signal (ACM signal) housing an output VPI and output VCI is sent back to the previous stage relay node 10 where this information is catalogued as the input VCI and input VPI of this relay stage 10 and the re-writing of the routing information table 1 is completed.

Next, the notification of direct path set up completion signal is sent between the relay node 10 (#2) and the transmission node 7 (#1) by using the VPI and the VCI of the transmission node 7 as parameters. The transmission node 7 (#1) then writes its own routing information table 1 according to the VPI and VCI housed within the ACM signal. In this way a direct path is set up between the transmission node 7 (#1), the relay node 10 (#2) and the receiving node 8 (#3).

In this way, it is possible to set up a call set up sequence by making a direct path between all the nodes without the use of complex additional hardware. Also, after a direct path has been set up, re-setting procedures other than alterations in the node organization are not necessary.

Figure 7:
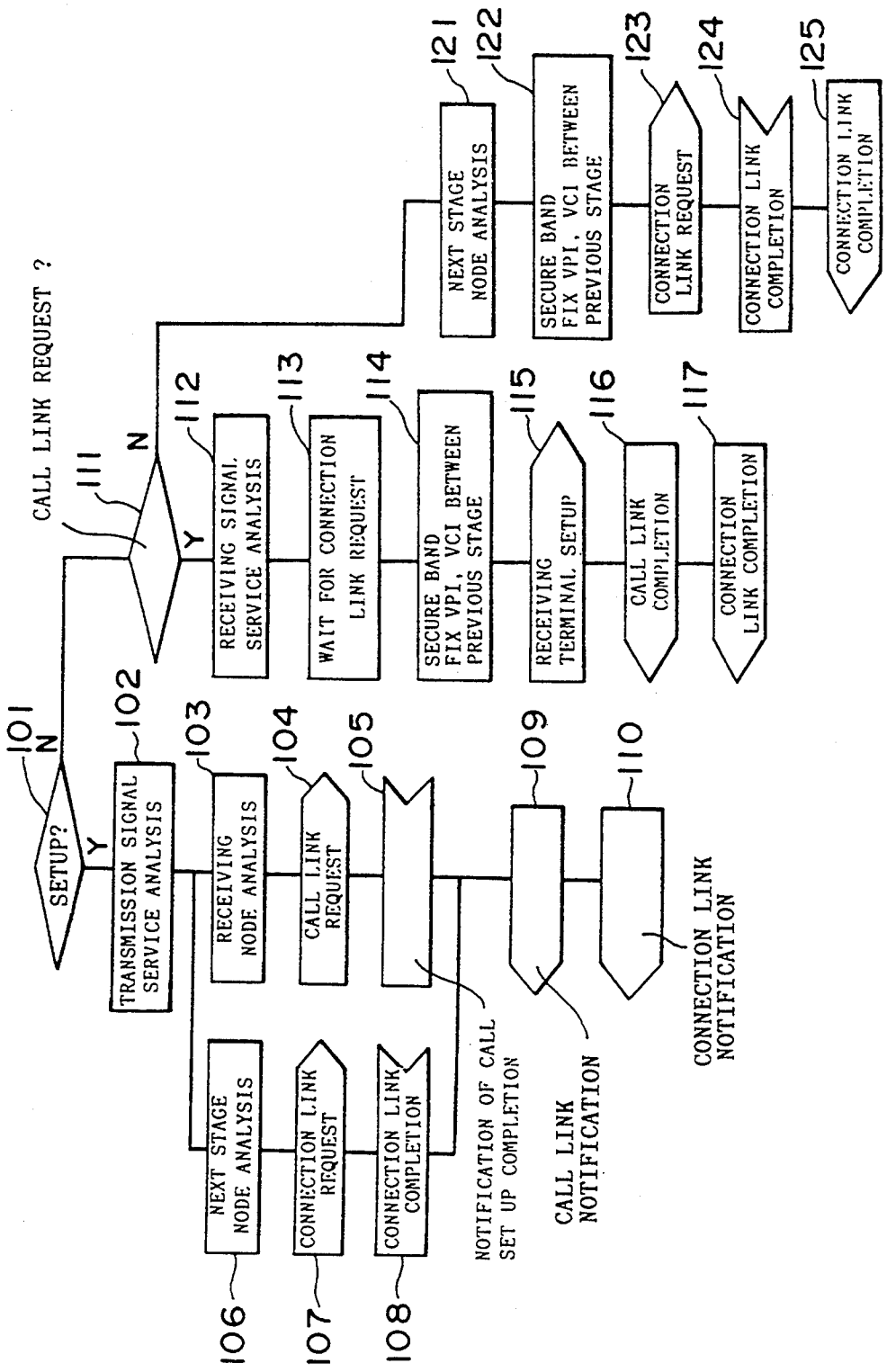
FIG. 7 is a flow diagram showing the call set up and connection link request process for each node.

FIG. 7 is a flow diagram showing the call set up and connection link request procedures for each node after the direct path has been set up in the way shown above.

In the case of the call set up, the cell 11 is sent form the transmission node 7 via the relay node 10 to the receiving node 8 without any management, as is also shown in FIG. 7. On the other hand, in the case of the connection link request, cell 11 is sent from the transmission node 7 to the receiving node 8 stage by stage while the VPI and VCI for every node are being decided.

When a node receives a signal the first step (step 101) is to decide whether or not it is a set up signal. If it is a set up signal, as the node will become a transmission node 7, the next step will be the transmission signal service analysis step (step 102). The steps for the transmission node 7 then split up into the call link request management steps (103-105) and the connection link request management steps (106-108).

In the call link request management branch of the flowchart, analysis of the receiving node 8 is first carried out. This analysis of the receiving node 8 is then referred to the call link isolation table 18 within the exchange control apparatus 2. The final node number (ID) is then decided with reference to the telephone number from the transmission terminal 6 and this receiving node number is then set up as the VCI. The call link request is then transmitted by the transmission node 7 (104). The call link request is then sent to the receiving node 8 via the direct path through the relay nodes 10 which has already been set up.

When the receiving node 8 receives a call link request it is sent on to the receiving terminal 13. A notification of call set up completion is then sent back by the receiving terminal 13 along the direct path to the transmission node 7 (105).

In the connection link request management branch of the flowchart, the relay node 10 is first analyzed with reference to the connection link analysis table 20 (106). This decides which relay node 10 the connection link request will be sent to next (107). At the relay node 10 the band secured VPI and VCI necessary for the connection link request are renewed and the transmission node 7 is notified. In this way a link is made between the transmission node 7 and the relay node 10. A sequence of relay nodes can also be linked together in this way. When a path between the transmission node 7 and the receiving node 8 has been completed, notification of connection request completion can the be sent from transmitting node 8 to receiving node 7 (108).

At the transmission node 7 notification of call link completion (105) and connection link completion (108) is received and the the transmission terminal is informed in that order (109,110).

If the node is a transmission node 7 then the call link request and the connection link request will be carried out side by side.

For the ease where the signal received is not a set up signal, i.e. where it is notification from another node rather than from the transmission terminal 6, it must be determined whether or not this notification is a call link request (111).

This notification will be determined to be a call link request only when the node is the receiving node 8 and in this way the call link request will take a straight path directly to this node.

Steps 111–117 show the call link request process which takes place at the receiving node 8.

At the receiving node 8, after the initial analysis of the receiving signal service, the call link request will arrive and the node then waits for the arrival of the connection link request (113).

When this connection link request arrives, the VPI and VCI between this node and the relay node is decided and a link with the relay node is established (114). At this time the connection link request is analyzed and it is necessary to secure a band for the VPI and VCI which is higher than that of the received request.

Next, the set up signal is transmitted to the receiving terminal 13. When this process is completed notification of call link completion is sent back to the transmission node 7 via the direct path. Notification of connection completion is then transmitted through the relay path which is set up through the relay nodes stage by stage.

Then, in the step 111, if the notification received at the node is not a call link request then it must be a connection link request, that is to say the node is a relay node 10.

The following is a description of the process for the relay nodes 10 in steps 121–125.

Firstly, an analysis of the next stage node is carried out with reference to the connection link analysis tables 20 within the exchange control apparatus 2 of each node (121).

Then, a band is secured between this relay node 10 and the previous stage node and the VPI and the VCI are decided upon (122).

In this way the connection link request from the previous stage node is received (123), and the notification of the connection link completion is transmitted via the link with the previous stage established in step 122 (124). The notification of the connection link completion is then received from the next stage (125) so as to complete the connection link request process for the relay node 10.

THIRD EMBODIMENT

Next, the process after the direct path between the transmission node and the receiving node has been set up will be described.

Figure 10:
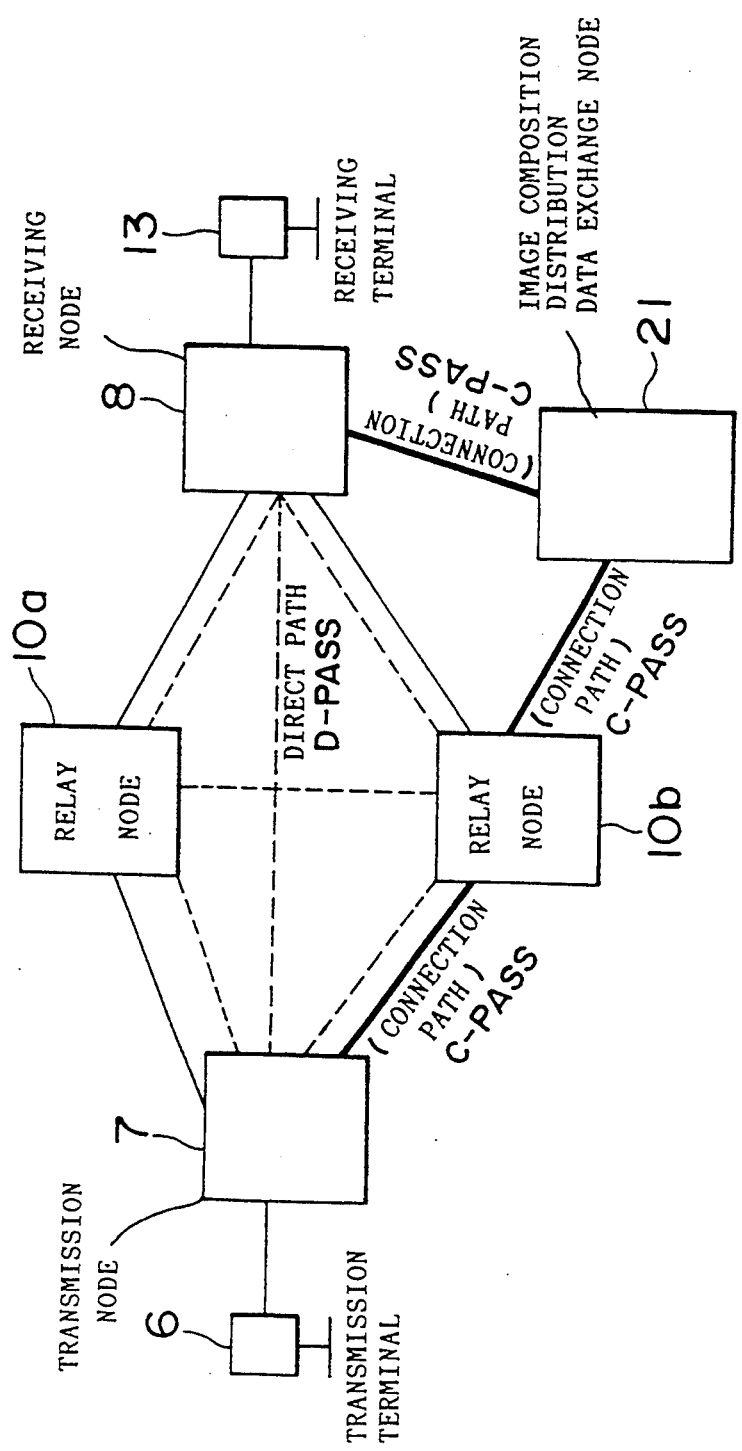
FIG. 10 is a view of the organization of a network for a third embodiment.

FIG. 10 is a view of the construction of a network for the present embodiment. This diagram does show the data exchange node 21 which was left out of the descriptions in FIGS. 4 and 5 for the sake of convenience.

The data exchange node 21 provides a mutual data exchange function for eases such as when there is layer incompatibility between the transmission terminal 6 and the receiving terminal 13. An example of this would be when there is a G3 type facsimile machine at one terminal and a G4 type facsimile machine at the other terminal.

Figure 11:
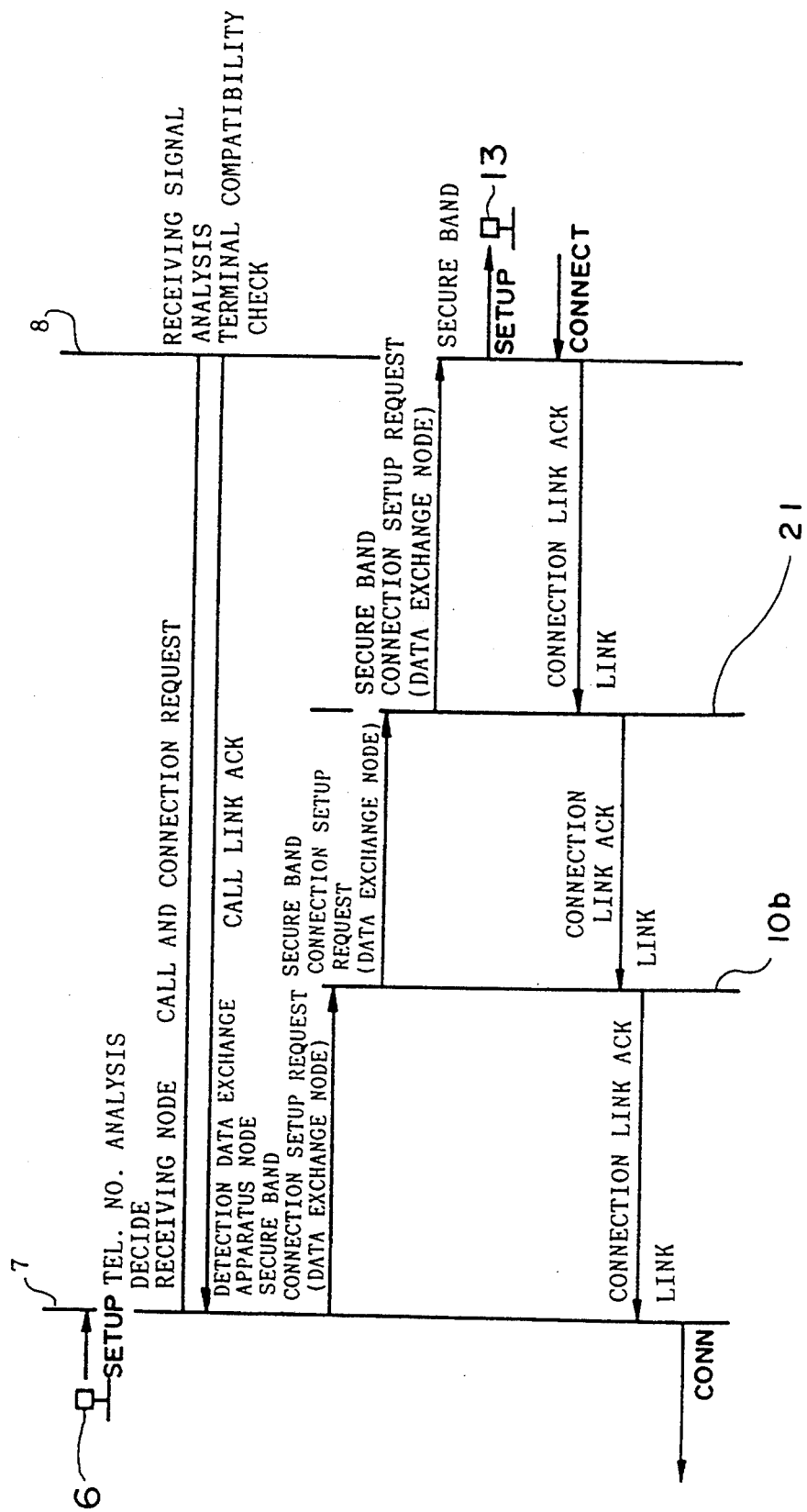
FIG. 11 shows a call link and connection link sequence when there are incompatibilities between the terminals for a third embodiment.

Now, a description of the call link and connection link sequences for the ease where there is incompatibility between the terminals will be given with reference to FIG. 11.

Firstly, the transmission node 7 receives the set up signal from the transmission terminal 6 and then decides which receiving node 8 it will be sent to by analyzing its telephone number. The receiving node 8 is then notified of the call link request via the direct path which has already been set up (the route represented by the dotted line running across the middle of FIG. 10). It is then determined whether or not the transmission terminal 6 and the receiving terminal 13 are compatible and the notification of call link completion is then returned to the transmission node 7. At this time, if the properties of the terminals are not compatible, details of these incompatibilities are included in the notification of call link completion so that the incompatibilities between the terminals can be understood at the transmission terminal 7.

Next, the connection link request is transmitted via the data exchange node 21 within the network to the receiving node 8. More specifically, the pass information (VPI) and channel information (VCI) for the header 9 are re-written to the next stage node via a secured path and using the information field 12 as a node selector, the cell 11 is transmitted catalogued with the I.D. for the data exchange node 21.

A link is established between the transmission node 7 and the relay node 10b and the connection link request is then sent from the transmission node 7 to the relay node 10b and then on to the data exchange node 21. Here, the data from the transmission terminal 6 are made compatible with the receiving terminal 13 and are then sent on to the receiving terminal 8, from which it is finally passed on to the receiving terminal 13.

Once the connection request has reached the receiving terminal 13 a route is established in the opposite direction to the receiving node 8, on to the data exchange node 21, on again to the relay node 10b and then to the receiving node 7 with the notification of link completion being sent along this path.

So, by keeping the call set up and connection separate in this way, it is possible to make connection links between the terminals which take into account incompatibilities between the terminals.

FOURTH EMBODIMENT

Figure 12:
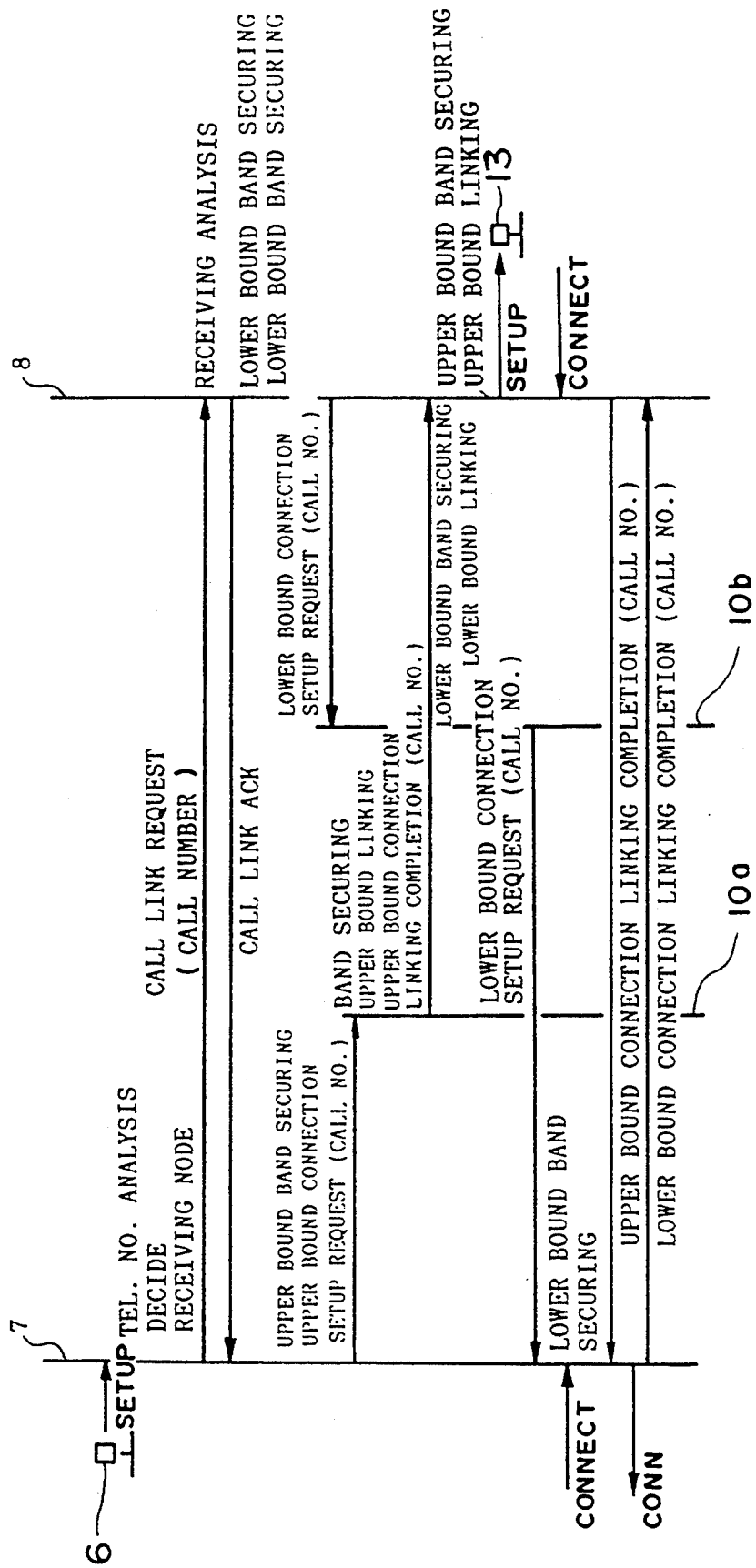
FIG. 12 shows the routes taken in going up and down between a transmission terminal and a receiving terminal in order to make connection links for a fourth embodiment.

FIG. 12 shows the sequence when the connection link takes a different route on the way up and on the way down.

In this fourth embodiment, after a direct path from the transmission node 7 to the receiving node 8 has been set up for the call link, connection link requests are made in parallel up from the transmission node 7 and down from the receiving node 8.

A detailed description will now be given with reference to FIG. 12. FIG. 10 will be referred to for describing the network organization for the sake of convenience.

A description of the call link will be omitted as it is the same as for the first and second embodiments.

After the call link has been completed, a necessary band is secured and a connection link request is transmitted up from the transmission node 7 in parallel with a further connection link request which is sent down from the receiving node 8. These upward and downward connection link requests then independently secure bands, making connections between the nodes stage by stage until eventually they will reach the receiving node 8 and the transmitting node 7, respectively.

In FIG. 12 the upper bound connection link request and the lower bound connection link request select different routes, with the upper bound connection link request going from the transmission node 7 via the relay node 10a to the receiving node 8 and the lower bound connection link request going from the receiving node 8 to the relay node 10b and on to the transmitting node 7.

Then, notification of upward bound connection completion (ACK) is sent from the receiving node 8, down to the transmitting node 7 and notification of downward bound connection completion is sent from the transmitting node 7, up to the receiving node 8, so that the connection linking is completed. It is therefore possible for calls to be recognized at transmission node 7 and receiving node 8 as these notification of connection link completions (ACKs) contain the call number parameter from the call link which had been set up previously.

In this fourth embodiment it is therefore possible by transmitting the connection link requests in parallel between transmission node 7 and receiving node 8 to have a connection linking process which takes place at high speed.

Also, when transmitting which employs different bandwidths for the upper bound and lower bound routes is applies to, for example, communications broadcasting such as T.V. and radio, highly efficient transmission lines can be established.

FIFTH EMBODIMENT

Figure 13:
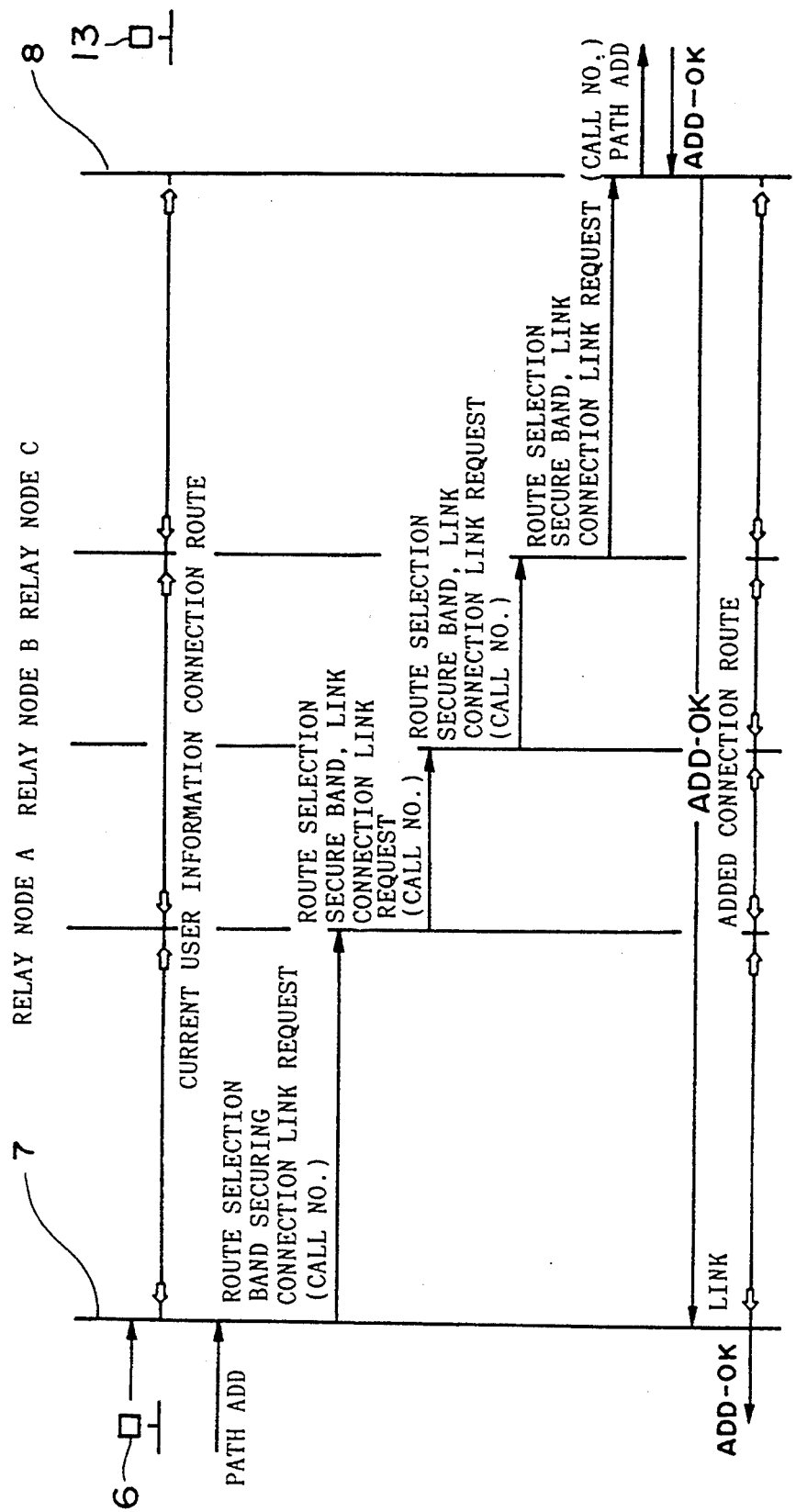
FIG. 13 shows the sequential addition of connections when transmitting from a transmission node to a receiving node for a fifth embodiment.

FIG. 13 shows the sequential addition of connections when transmitting from the transmission node 7 to the receiving node 8.

Figure 14:
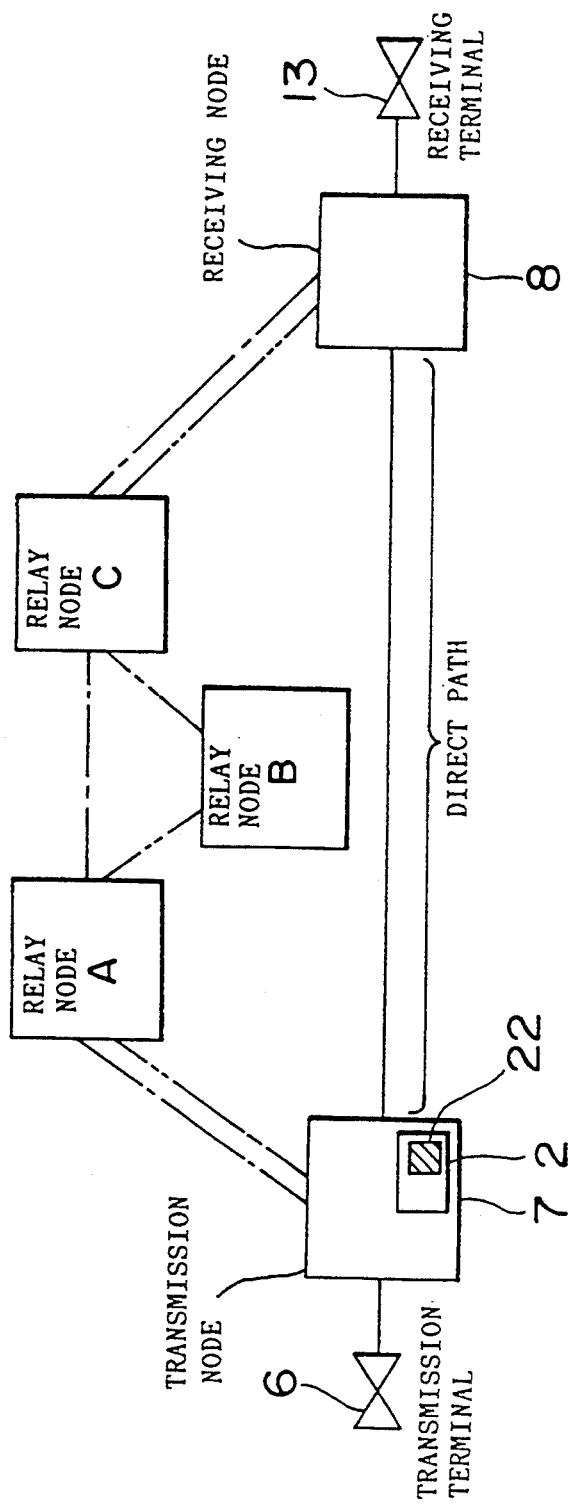
FIG. 14 shows the network organization for bandwidth addition and modification for a fifth embodiment.

FIG. 14 shows the situation when bandwidth addition is used in the network. In this fifth embodiment, there is a pass addition control unit 22 inside the transmission nodes 7 exchange control apparatus 2 This pass addition unit 22 can either be hardware based within the internal workings of the exchange control apparatus 2 or can be a function incorporated into the software of this exchange control apparatus 2.

In this fifth embodiment, as is shown in FIG. 14, the call set up is sent via a direct path between the transmission node 7 and the receiving node 8. The connection path then goes from the transmission node 7 to the relay node "A", on to the relay node "C" and then to the receiving node 8, as indicated by the dash and single dotted line in FIG. 14.

Then, the audio only is transmitted between the relay node "A" and the relay node "C" at a transmission rate in free space of 50 Mbps (mega-bits per second).

At this time a request is generated to transfer moving image information at 150 Mbps from the transmission terminal 6. However, as information is sent from the transmission terminal 7 to the receiving terminal 8 along a connection path at a transmission rate of 50 Mps, the moving image information cannot be transferred using the current connection path indicated by the dash and single dotted line in FIG. 13. As a result of this a new connection link request (PASS ADD) determined by the pass addition control apparatus 22 inside the transmission node 7 is transmitted, as is shown in FIG. 13. This connection link request (PASS ADD) transmits a cell, the information field of which contains a catalogue of the required band connection parameter and the call number parameter, on to the next stage node. This is to say that each node firstly selects a route to the next stage, a band is secured according to the answer from the next stage, a connection link request is sent to the next stage and a link is established. In this way the necessary band (150 Mbps) can be secured and a new wide band connection path can be set up from the transmission node 7 to the relay node "A", on to the relay node "B", on again to the relay node "C" and then on to the receiving node 8.

This expansion of the bandwidth is only necessary for the upper bound route (transmission node 7 to receiving node 8) as the lower bound route (receiving node 8 to transmission node 7) can simply use the old connection path.

When the transmission node 7 receives notification of connection link completion (ADD-OK) from the receiving terminal 13 and the receiving node 8, the transmission changes over to the new connection path (the route indicated by the dash and double dotted line in FIG. 14) and the moving image is transferred via this route.

According to this fifth embodiment, by having an existing connection path and then having a new wide band connection path it is possible to minimize the lost call rate.

SIXTH EMBODIMENT

Figure 15:
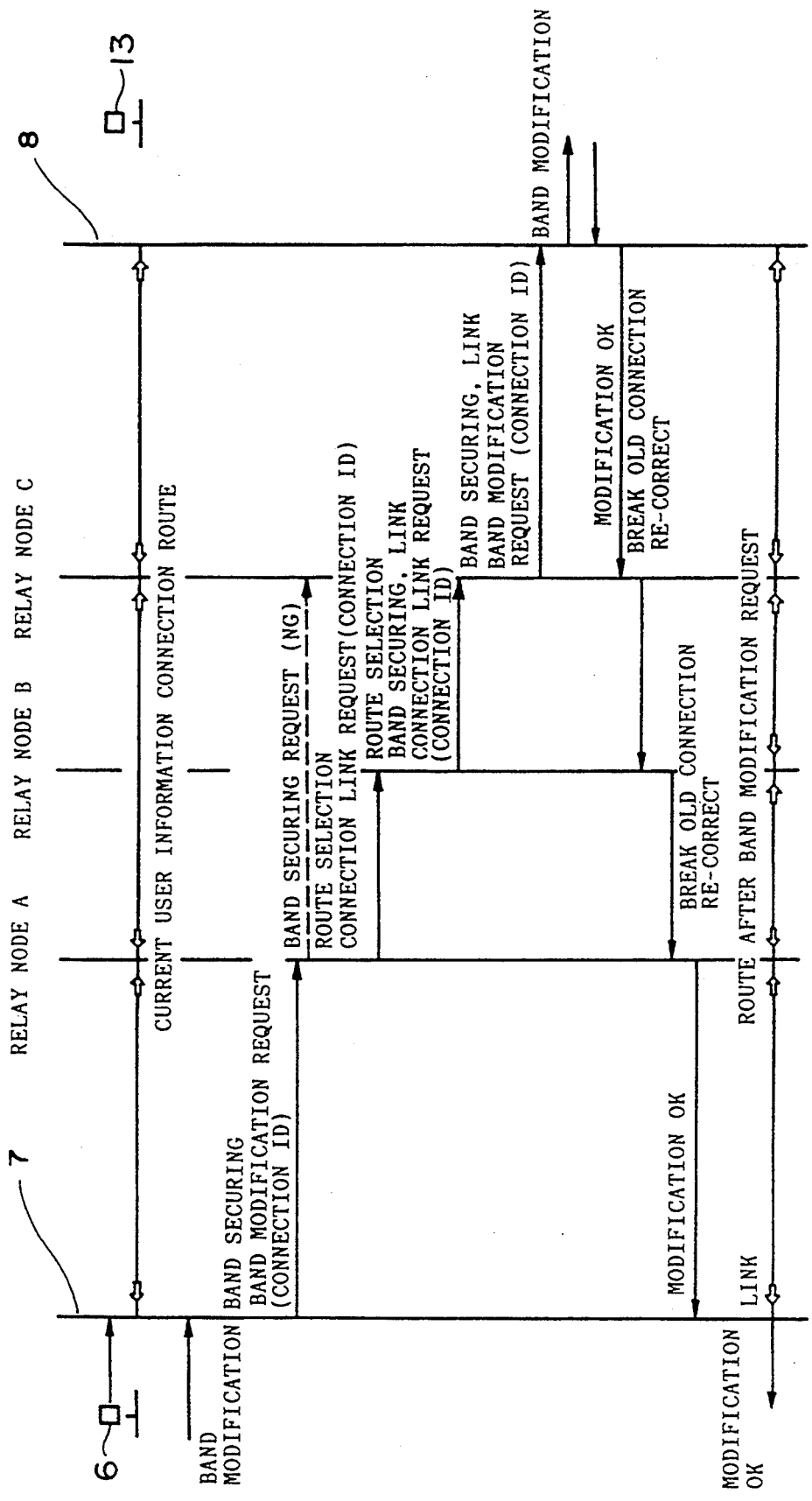
FIG. 15 shows an example sequence for a connection path modification when there is a bandwidth modification request in a sixth embodiment.

FIG. 15 shows the sequence for the case when one part of a path cannot secure a band while there is a band modification request coming from the transmission terminal 6, as is also the ease with the fifth embodiment, and an example of connection path modification to reduce the number of unnecessary bands to improve the efficiency of use of the transmission lines.

For the sake of convenience a description of the network organization will be given with reference to FIG. 14.

Here, as with the fifth embodiment, the call set up is sent via a direct path between the transmission node 7 and the receiving node 8. The connection path then goes from the transmission node 7 to the relay node "A", on to the relay node "C" and then to the receiving node 8, as indicated by the dash and single dotted line in FIG. 14.

If, at this time, there is a band modification request from the transmission terminal, there will be an attempt to secure a band on the current connection path. If there is a band modification request from the transmission node 7, parameters such as the node ID for the transmission node 7 and the ID of the path currently set up are stored in the information field 12 of the cell 11 and then transmitted.

In FIG. 15, a band securing request is made between the relay node "A" and the relay node "C" via the connection path currently set up. However, this request is rejected as the band transmission rate of this path is too low. A connection link request is therefore transmitted with the intention of securing a path between the relay node "A" and the relay node "B". Again in FIG. 15, by securing the necessary band a new path is established between relay node "A" and relay node "B". By establishing a sequence of paths between the relay nodes in this way a new connection route can be made.

When a band modification request reaches the receiving terminal 13, notification of band modification completion is sent back to the transmission terminal 6. As a result of this the connection path for the previous route is cut and is replaced by the new connection path.

When notification of band modification completion reaches the transmission node 7 transmissions will then take place via the new connection path (as indicated by the dash and double dotted line in FIG. 14).

Although the above description used the case of band expansion, once the moving image information transfer is completed this embodiment could also be used, for example, for band shrinking of normal audio transmissions where a band modification request could be transmitted to enable the selection of the lowest possible sufficient band suitable for audio transmissions.

In this way, by modifying or shrinking the band of the connection path it is possible to use the transmission lines in a more efficient manner.

SEVENTH EMBODIMENT

Figure 16:
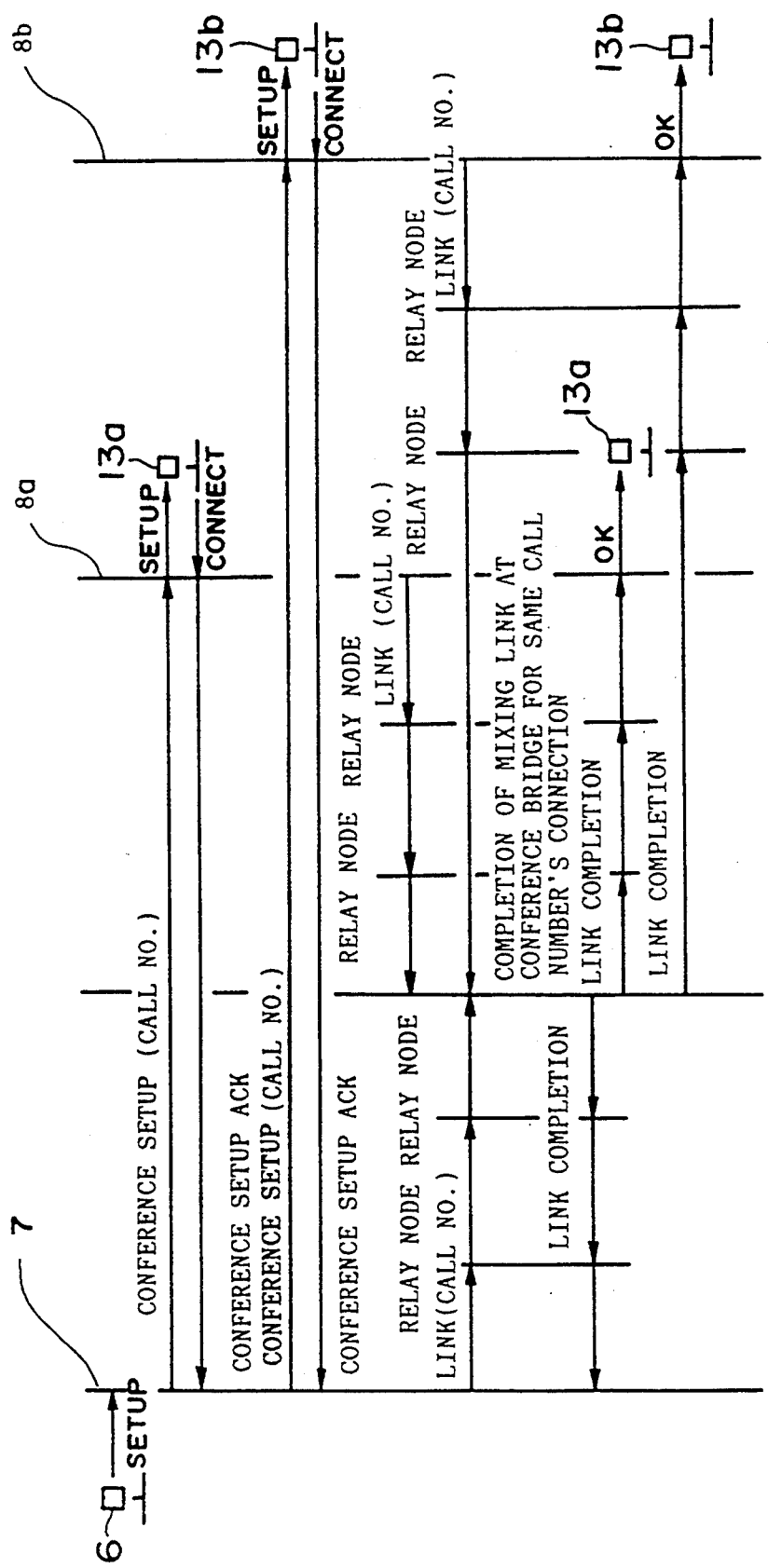
FIG. 16 shows the call link and connection link sequences in a network for a conference system for a seventh embodiment.
Figure 17:
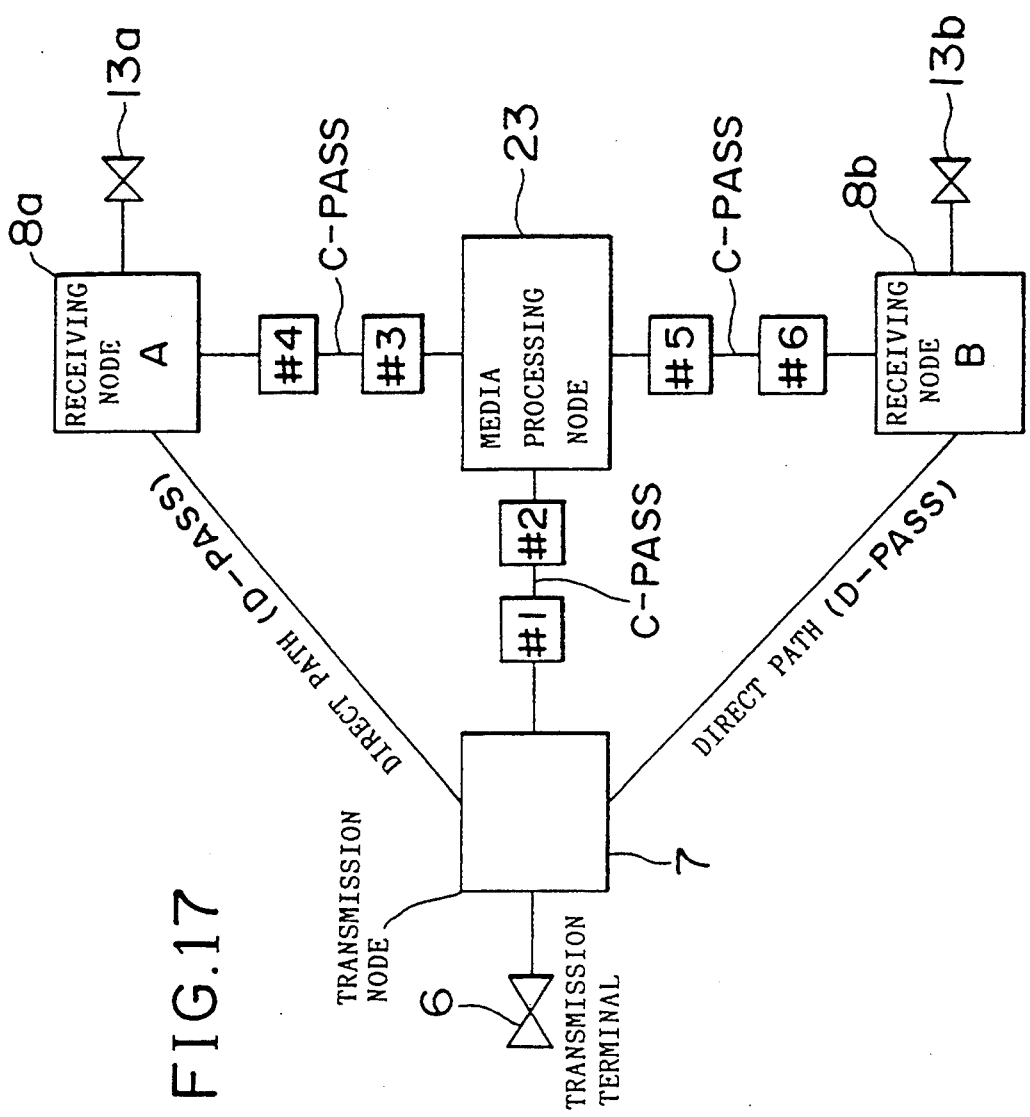
FIG. 17 is a block diagram of the network organization in a conference system for this seventh embodiment.

FIG. 16 shows the call link and connection link sequences in a network for a conference system and FIG. 17 is a block diagram of the network organization in a conference system for this seventh embodiment.

In FIG. 17, the media processing node 23 transmits connections having the same call number between the transmission terminal 6 and the receiving terminals 13a and 13b, and #1–#6 are relay nodes.

When a set up signal from the transmission terminal 6 is received by the transmission node 7, call link requests are transmitted through the receiving nodes "A" (8a) and "B" (8b) to the receiving terminals 13a and 13b (conference SET UP) via the direct path already set up.

Once the call link paths between the nodes have been completed (7–8a, 7–13b), connection link requests are sent in parallel from the nodes 7, 8a and 8b via the relay nodes (1#–6#) to the media processing node 23. A connection path is then set up between the media processing node 23 and the nodes 7, 8a and 8b by securing bands between the nodes to join the stages. A connection link request is then made using a cell 11 as its information field 12 will house information such as a characteristic call number (i.e. transmission node ID and a management call number for within the network). This information can then be used within the media processing node 23 to discern which conference participant the connection link request came from.

Therefore, according to this seventh embodiment, it is possible to set up connection paths at high speeds as the conference control (call set up) is made from a node separate from that used for the conference bridge (in FIG. 7 this is transmission node 7), the workload is well dispersed between the nodes and and the connection path is set up simultaneously (in Parallel) between each node and the next node.

What is claimed is:

1. A call set up system for a transmission exchange network which transfers cells including routing information between a plurality of individually numbered nodes, comprising:
   a plurality of routing information tables each provided in a respective node of the plurality of nodes, for cataloguing the routing information for the respective node;
   a plurality of exchange control units each provided in a respective node of said plurality of nodes, for managing the associated routing information table of the respective node;
   a plurality of switching units each provided in a respective node of said plurality of nodes, for switching a cell between said plurality of nodes, the routing information of the cell being rewritten according to contents of the associated routing information table; and
   a maintenance center including a network organization data base in which a transmission node number and an output route number for each of the nodes are catalogued, said maintenance center previously setting up a plurality of direct paths between all of the nodes, which are to be managed by said maintenance center, by giving notification of a receiving node number and an output route number for each of the nodes and by cataloguing the receiving node number, as the routing information, with the output route number in said routing information table, a call set up being made to a receiving node via one of said direct paths, which is regulated by the corresponding routing information table, upon arrival of a call set up request cell at any one of a number of transmission nodes connected to a transmission terminal, one of said transmission nodes analyzing the call set up request cell to determine a receiving node and writing the receiving node number of the determined receiving node in the routing information of the call set up request cell.

2. A call set up method for a transmission exchange network which transfers cells including routing information between a plurality of individually numbered nodes, comprising the steps of:
   providing in each of the plurality of nodes, a routing information table for cataloguing the routing information for the individual node, an exchange control unit for managing a respective routing information table, and a switching unit for switching a cell between said plurality of nodes, the routing information of the cell being rewritten according to contents of a respective routing information table;
   each of the nodes sending a direct path set up request for all of the other said nodes to a next stage node;
   entering individual direct path set up requests into said next stage node if said direct path set up requests are to said next stage node;

said next stage node resending said direct path set up requests to a further next stage node if said direct path set up requests are not to said next stage node;

the node in which the direct path set up requests are entered sending back a path set up completion notice, with path information (VPI) and channel information (VCI) as parameters, to the node which sent said direct path set up requests;

previously setting up a plurality of direct paths to a source node between all of the nodes by rewriting the respective routing information table based on said parameters; and making a call set up to a receiving node via one of said direct paths, which is regulated by the corresponding routing information table, upon arrival of a call set up request cell at any one of a number of transmission nodes connected to a transmission terminal, one of said transmission nodes analyzing the call set up request cell to determine a receiving node and writing the receiving node number of the determined receiving node in the routing information of the call set up request cell.

3. A connection linking system for a transmission network which transfers information cells from a transmission terminal to a receiving terminal via a plurality of nodes, comprising:

a plurality of direct paths previously set up between all of the plurality of nodes;

a transmission node connected to the transmission terminal;

a receiving node connected to said receiving terminal; and a data exchange node having a high speed exchange function, said transmission node notifying said receiving node and said receiving terminal (13) of receipt of a call link request via one of said direct paths, said transmission node, upon further determining layer incompatibilities between said transmission terminal and said receiving terminal, setting up a connection path leading to said receiving node via said data exchange node separate from said one direct path.

4. A connection linking system for a transmission network which transfers information cells from a transmission terminal to a receiving terminal via a plurality of nodes, comprising:

a plurality of direct paths previously set up between all of the plurality of nodes;

a transmission node connected to the transmission terminal;

a receiving node connected to said receiving terminal; and a relay node, said transmission node notifying said receiving node and said receiving terminal of receipt of a call link request via one of said direct paths and receiving a call link request completion notice from said receiving terminal and said receiving node via one of said direct paths, upon receipt of the call link request completion notice, said transmission node sending a connection path set up request to said receiving node while said receiving node sends a connection path to said transmission node.

5. A call set up system according to claim 1, further comprising a connection linking system for a transmission network which transfers information cells from a transmission terminal to a receiving terminal via a plurality of nodes, comprising:

a plurality of direct paths previously set up between all of the plurality of nodes;

a transmission node connected to the transmission terminal and equipped with an additional path control unit;

a receiving node connected to said receiving terminal; and a relay node, when a call link is completed via one of said direct paths and while a connection path is leading from said transmission node to said receiving node via said relay node, said transmission node independently sets up an additional path, which is different from said connection path, by controlling said additional path control unit if a band addition request is made from said transmission terminal.

6. A call set up system according to claim 1, further comprising a connection linking system for a transmission network which transfers information cells from a transmission terminal to a plurality of receiving terminals via a plurality of nodes, comprising:

a plurality of direct paths previously set up between all of the plurality of nodes;

a first-named node including a group of said plurality of nodes connected at one end to said transmission terminal and at the other end to a group of said plurality of receiving terminals, respectively; and a media process node for distributing and transmitting a signal from any one node in the group of the first-named nodes to the remaining nodes in the group of the first-named nodes, upon completion of a call link between the nodes, via said direct paths, a connection link request from each node in the group of nodes is sent to all of the remaining nodes via said media process node, via associated relay nodes.

7. A call set up system for a transmission exchange network which transfers cells including routing information between a plurality of individually numbered nodes, comprising:

a plurality of routing information tables each provided in a respective node of the plurality of nodes, for cataloguing the routing information for the respective node;

a plurality of exchange control units each provided in a respective node of said plurality of nodes, for managing the associated routing information table of the respective node;

a plurality of switching units each provided in a respective node of said plurality of nodes, for switching a cell between said plurality of nodes, the routing information of the cell being rewritten according to contents of the associated routing information table; and a maintenance center including a network organization data base in which a transmission node number and an output route number for each of the nodes are catalogued, said maintenance center previously setting up a plurality of direct paths between all of the nodes, which are to be managed by said maintenance center, by giving notification of a receiving node number and an output route number for each of the nodes and by cataloguing the receiving node number, as the routing information, with the output route number in said routing information table, a call set up being made to a receiving node via one of said direct paths, which is regulated by the corresponding routing information table, upon arrival of a call set up request cell at any one of a number of transmission nodes connected to a transmission terminal, a connection link request to a next stage node being made in parallel with the call set up request from one of said transmission nodes to a receiving node via the one direct path.

8. A call set up method for a transmission exchange network which transfers cells including routing information between a plurality of individually numbered nodes, comprising the steps of:
   providing in each of the plurality of nodes, a routing information table for cataloguing the routing information for the individual node, an exchange control unit for managing a respective routing information table, and a switching unit for switching a cell between said plurality of nodes, the routing information of the cell being rewritten according to contents of a respective routing information table;
   each of the nodes sending a direct path set up request for all of the other said nodes to a next stage node;
   entering individual direct path set up requests into said next stage node if said direct path set up requests are to said next stage node;
   said next stage node resending said direct path set up requests to a further next stage node if said direct path set up requests are not to said next stage node;
   the node in which the direct path set up requests are entered sending back a path set up completion notice, with path information (VPI) and channel information (VCI) as parameters, to the node which sent said direct path set up requests;
   previously setting up a plurality of direct paths to a source node between all of the nodes by rewriting the respective routing information table based on said parameters;
   making a call set up to a receiving node via one of said direct paths, which is regulated by the corresponding routing information table, upon arrival of a call set up request cell at any one of a number of transmission nodes connected to a transmission terminal; and
   making a connection link request to a next stage node in parallel with the call set up request from one of said transmission nodes to a receiving node via the one direct path.

9. A call set up method according to claim 2, further comprising a connection linking method for a transmission network which transfers information cells from a transmission terminal to a receiving terminal via a plurality of nodes, comprising the steps of:
   providing a plurality of direct paths previously set up between all of the plurality of nodes;
   connecting a transmission node to the transmission terminal and equipping said transmission node with an additional path control unit;
   connecting a receiving node to said receiving terminal;
   providing a relay node; and
   when a call link is completed via one of said direct paths and while a connection path is leading from said transmission node to said receiving node via said relay node, said transmission node independently setting up an additional path, which is different from said connection path, by controlling said additional path control unit if a band addition request is made from said transmission terminal.

10. A call set up method according to claim 2, further comprising a connection linking method for a transmission network which transfers information cells from a transmission terminal to a plurality of receiving terminals via a plurality of nodes, comprising the steps of:
   providing a plurality of direct paths previously set up between all of the plurality of nodes;
   connecting a first-named node including a group of said plurality of nodes at one end to said transmission terminal and at the other end to a group of said plurality of receiving terminals, respectively;
   distributing and transmitting a signal from any one node in the group of the first-named nodes to the remaining nodes in the group of the first-named nodes via a media process node; and
   upon completion of a call link between the nodes, via said direct paths, sending a connection link request from each node in the group of nodes to all of the remaining nodes via said media process node, via associated relay nodes.

* * * * *

UNITED STATES PATENT AND TRADEMARK OFFICE
CERTIFICATE OF CORRECTION

PATENT NO. : 5,444,699
DATED : August 22, 1995
INVENTOR(S) : Yoshihiro WATANABE

It is certified that error appears in the above-indentified patent and that said Letters Patent is hereby corrected as shown below:

ON THE TITLE PAGE:

Item [57] ABSTRACT, line 5, delete "(13)" [both occurrences], and line 8, delete "(8)" [both occurrences].

Signed and Sealed this

Nineteenth Day of March, 1996

Attest:

BRUCE LEHMAN

*Attesting Officer*            *Commissioner of Patents and Trademarks*

UNITED STATES PATENT AND TRADEMARK OFFICE
CERTIFICATE OF CORRECTION

PATENT NO. : 5,444,699
DATED : August 22, 1995
INVENTOR(S) : Yoshihiro WATANABE

It is certified that error appears in the above-indentified patent and that said Letters Patent is hereby corrected as shown below:

Column 5, line 51, after "and" insert --Fig. 8(b)-- shows--.

Signed and Sealed this

Twenty-fourth Day of September, 1996

Attest:

BRUCE LEHMAN

*Attesting Officer*   *Commissioner of Patents and Trademarks*